United States Patent
Kim et al.

(10) Patent No.: US 12,374,020 B2
(45) Date of Patent: Jul. 29, 2025

(54) APPARATUS AND METHOD FOR GENERATING TEXTURE MAP OF 3-DIMENSIONAL MESH

(71) Applicant: Electronics and Telecommunications Research Institute, Daejeon (KR)

(72) Inventors: Soo-Woong Kim, Daejeon (KR); Jung-Won Kang, Daejeon (KR); Ji-Hoon Do, Daejeon (KR); Gun Bang, Daejeon (KR); Seong-Jun Bae, Daejeon (KR); Jin-Ho Lee, Daejeon (KR); Ha-Hyun Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 211 days.

(21) Appl. No.: 18/114,118

(22) Filed: Feb. 24, 2023

(65) Prior Publication Data
US 2024/0144578 A1    May 2, 2024

(30) Foreign Application Priority Data
Oct. 14, 2022    (KR) .................. 10-2022-0132439

(51) Int. Cl.
| | | |
|---|---|---|
| G06T 15/04 | (2011.01) | |
| G06N 3/08 | (2023.01) | |
| G06T 9/00 | (2006.01) | |
| G06T 17/00 | (2006.01) | |
| G06T 17/20 | (2006.01) | |

(52) U.S. Cl.
CPC ................ G06T 15/04 (2013.01); G06T 9/00 (2013.01); G06T 17/20 (2013.01)

(58) Field of Classification Search
CPC ....... G06T 15/04; G06T 15/503; G06T 7/529; G06T 9/001; G06T 17/00; G06T 17/20; G06T 19/00; G06T 2219/2021; G06N 3/08; G06N 3/0455; G06N 3/0464
See application file for complete search history.

(56) References Cited

U.S. PATENT DOCUMENTS

| | | |
|---|---|---|
| 2011/0037763 A1 | 2/2011 | Lee et al. |
| 2021/0233282 A1 | 7/2021 | Kim et al. |
| 2021/0409672 A1 | 12/2021 | Cole et al. |

(Continued)

FOREIGN PATENT DOCUMENTS

| | | | |
|---|---|---|---|
| KR | 1020210077636 A | 6/2021 | |
| WO | WO-2020174215 A1 * | 9/2020 | ............... G06N 3/04 |

OTHER PUBLICATIONS

Esmaeil Faramarzi et al., [V-PCC] [New Proposal] Improved Texture Padding, International Organisation for Standardisation Organisation Internationale De Normalisation, ISO/IEC JTC1/SC29/WG11, Coding of Moving Pictures and Audio, ISO/IEC JTC1/SC29/WG11 MPEG2018/m46202, Jan. 2019, Samsung Electronics, Marrakech, Morocco.

*Primary Examiner* — Wesner Sajous
(74) *Attorney, Agent, or Firm* — Sughrue Mion, PLLC

(57) ABSTRACT

Disclosed herein is a method for generating a texture map of a 3D mesh includes encoding a texture map of a 3D mesh, quantizing the encoded texture map, decoding the quantized texture map, performing rendering using the decoded texture map, and updating the texture map of the 3D mesh based on the value of a loss function.

8 Claims, 15 Drawing Sheets

(56) References Cited

U.S. PATENT DOCUMENTS

2023/0048906 A1* 2/2023 Zhao ................. G06T 17/00
2023/0104199 A1* 4/2023 Volkov ............... G06T 15/06
                                                    345/426
2023/0401755 A1* 12/2023 Mammou ........... G06T 9/001

* cited by examiner

APPARATUS AND METHOD FOR GENERATING TEXTURE MAP OF 3-DIMENSIONAL MESH

CROSS REFERENCE TO RELATED APPLICATION

This application claims priority to Korean Patent Application No. 10-2022-0132439, filed Oct. 14, 2022, in the Korean Intellectual Property Office, which is hereby incorporated by reference in its entirety into this application.

BACKGROUND OF THE INVENTION

1. Technical Field

The present disclosure relates to technology for improving the compression performance of a texture map of a three-dimensional (3D) mesh reconstructed from multi-view images.

More particularly, the present disclosure relates to technology for updating a texture map by reflecting compression performance and rendering performance.

2. Description of the Related Art

When a 3D mesh is reconstructed from multi-view images, a high-resolution mesh having a lot of geometric and topological noise is generated due to errors in a depth estimation algorithm or errors and noise in a depth sensor. When such a mesh is mapped to two dimensions (when UV-parameterization is performed), the surface of the mesh is segmented (fragmented) into a large number of regions and mapped onto a 2D plane (a UV map), and when texture is stored in the UV map, a texture map image having highly discontinuous texture, which is difficult to be compressed, is generated. The present disclosure relates to technology for improving the compression performance of a texture map by optimizing the space between the fragmented texture regions in terms of rate-distortion.

DOCUMENTS OF RELATED ART (Patent Document 1) Korean Patent Application Publication No. 10-2021-0077636, titled "Multi-view video encoding and decoding method".

SUMMARY OF THE INVENTION

An object of the present disclosure is to improve the compression performance of a texture map of a 3D mesh reconstructed from multi-view images.

Another object of the present disclosure is to provide technology for updating a texture map by reflecting compression performance and rendering performance.

In order to accomplish the above objects, a method for generating a texture map of a three-dimensional (3D) mesh according to an embodiment of the present disclosure includes encoding a texture map of a 3D mesh, quantizing the encoded texture map, decoding the quantized texture map, performing rendering using the decoded texture map, and updating the texture map of the 3D mesh based on the value of a loss function.

Here, the loss function may include a first loss function corresponding to compression performance of the texture map and a second loss function corresponding to rendering performance of the texture map.

Here, encoding the texture map may be performed using a differentiable encoder, and performing the rendering may be performed using a differentiable renderer.

Here, the first loss function may be calculated based on a quantized compression expression vector of the texture map of the 3D mesh.

Here, the second loss function may be calculated using a rendered image and an original image.

Here, the second loss function may be calculated using a binary mask for reflecting an unrendered pixel.

Here, performing the rendering may comprise performing the rendering using the unencoded texture map of the 3D mesh.

Also, in order to accomplish the above objects, an apparatus for generating a texture map of a 3D mesh according to an embodiment of the present disclosure includes an encoding unit for encoding a texture map of a 3D mesh, a quantization unit for quantizing the encoded texture map, a decoding unit for decoding the quantized texture map, a rendering unit for performing rendering using the decoded texture map, and a learning unit for updating the texture map of the 3D mesh based on the value of a loss function.

Here, the loss function may include a first loss function corresponding to compression performance of the texture map and a second loss function corresponding to rendering performance of the texture map.

Here, the encoding unit may perform encoding using a differentiable encoder, and the rendering unit may perform rendering using a differentiable renderer.

Here, the first loss function may be calculated based on a quantized compression expression vector of the texture map of the 3D mesh.

Here, the second loss function may be calculated using a rendered image and an original image.

Here, the second loss function may be calculated using a binary mask for reflecting an unrendered pixel.

Here, the rendering unit may perform rendering using the unencoded texture map of the 3D mesh.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
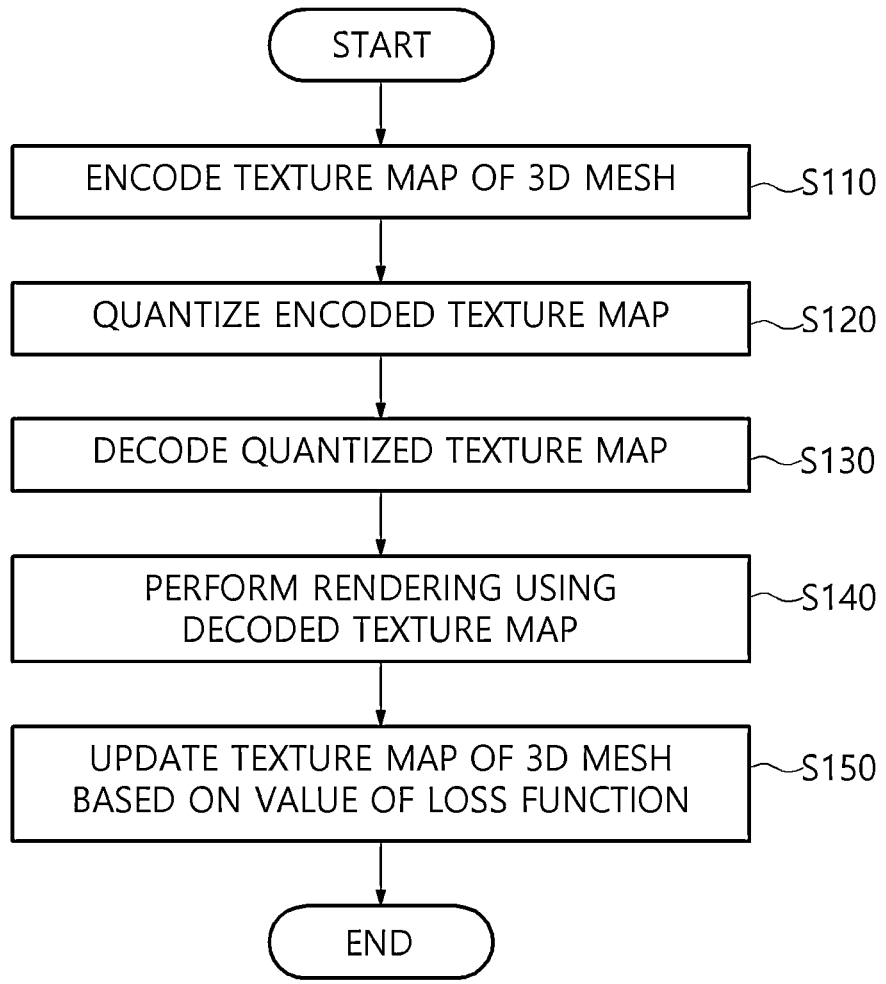
FIG. 1 is a flowchart illustrating a method for generating a texture map of a 3D mesh according to an embodiment of the present disclosure.

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a method for generating a texture map of a 3D mesh according to an embodiment of the present disclosure.

The method for generating a texture map of a 3D mesh according to an embodiment may be performed by a texture map generation apparatus such as a computing device.

Referring to FIG. 1, the method for generating a texture map of a 3D mesh according to an embodiment of the present disclosure includes encoding a texture map of a 3D mesh at step S110, quantizing the encoded texture map at step S120, decoding the quantized texture map at step S130, performing rendering using the decoded texture map at step S140, and updating the texture map of the 3D mesh based on the value of a loss function at step S150.

Here, the loss function may include a first loss function corresponding to the compression performance of the texture map and a second loss function corresponding to the rendering performance of the texture map.

Here, encoding the texture map at step S110 may be performed using a differentiable encoder, and performing the rendering may be performed using a differentiable renderer.

Here, the first loss function may be calculated based on the quantized compression expression vector of the texture map of the 3D mesh.

Here, the second loss function may be calculated using a rendered image and an original image.

Here, the second loss function may be calculated using a binary mask for reflecting unrendered pixels.

Here, performing the rendering may comprise performing rendering using the unencoded texture map of the 3D mesh.

Hereinafter, a method for generating a texture map according to an embodiment of the present disclosure will be described in detail with reference to FIGS. 2 to 18.

Figure 2:
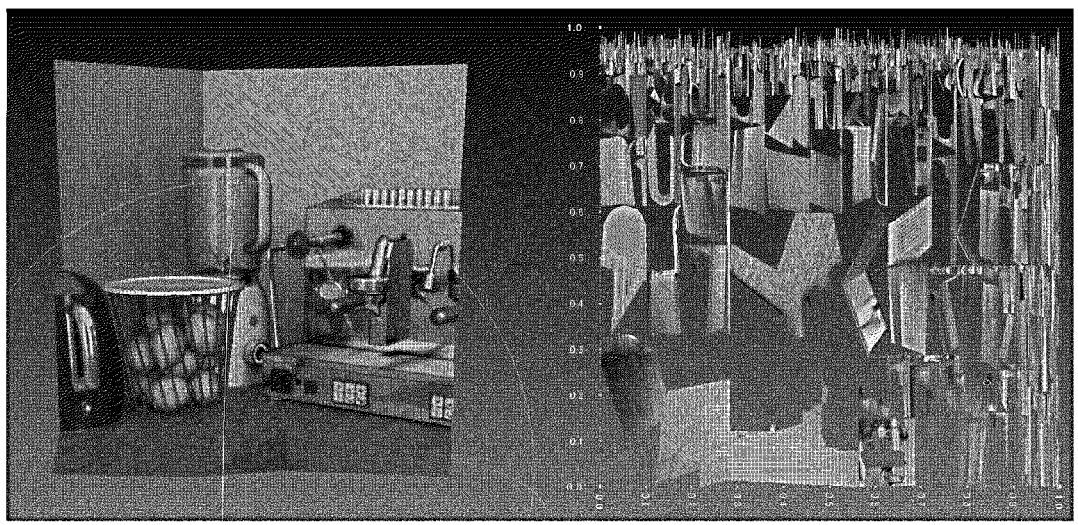
FIG. 2 illustrates a result of UV-parameterization of a 3D computer graphic mesh.

FIG. 2 illustrates a result of UV-parameterization of a 3D computer graphic mesh.

Figure 3:
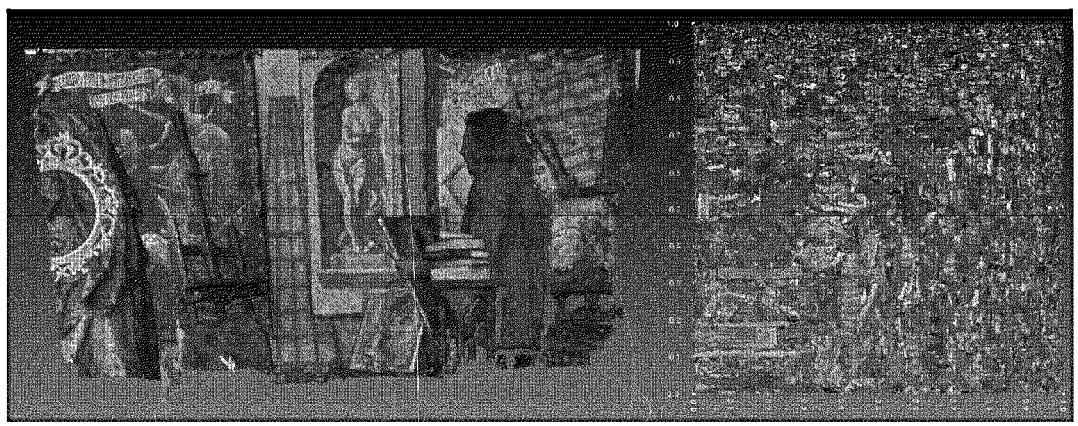
FIG. 3 illustrates a result of UV-parameterization of a 3D mesh based on multi-view real images.

FIG. 3 illustrates a result of UV-parameterization of a 3D mesh based on multi-view real images.

Referring to FIGS. 2 and 3, it can be seen that the result of UV-parameterization of a 3D mesh based on multi-view real images is more fragmented than the result of UV-parameterization of a 3D computer graphic mesh.

The reason for fragmentation of the UV map of the 3D mesh based on real images is that errors in camera calibration, errors in a 3D reconstruction algorithm, errors in an imaging sensor, and the like result in an increase in geometric and topological noise in the reconstructed 3D mesh.

When a mesh texture map is generated using the fragmented UV-parameterization result, the degree of discontinuity of the texture is increased, which decreases image compression efficiency and increases a compression bitrate.

As a method for solving the above problems, there is a method of padding empty regions in the texture map using a Smoothed Push-Pull (SPP) algorithm.

Figure 4:
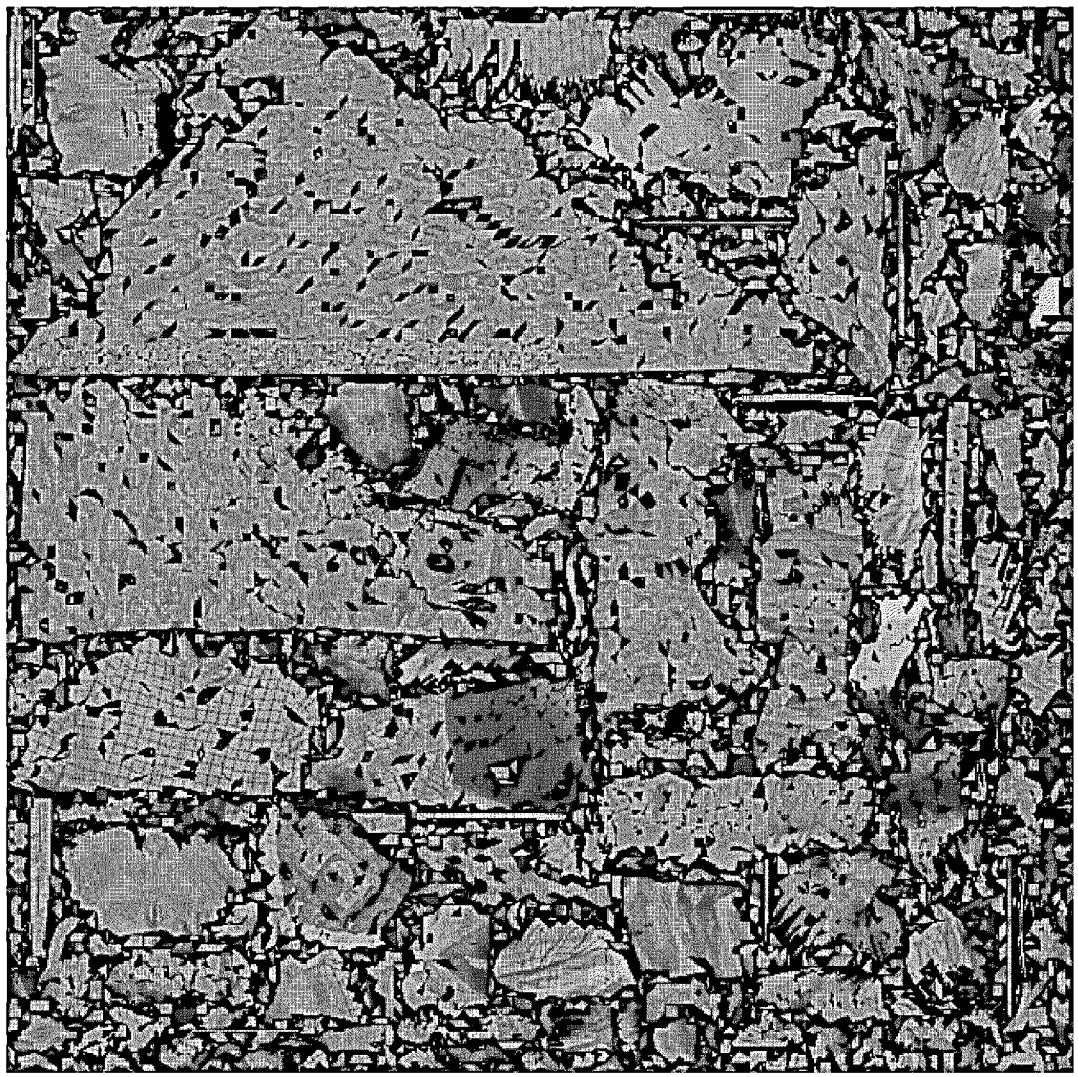
FIG. 4 illustrates a UV texture map of a 3D mesh based on multi-view real images.

FIG. 4 illustrates a UV texture map of a 3D mesh based on multi-view real images.

Figure 5:
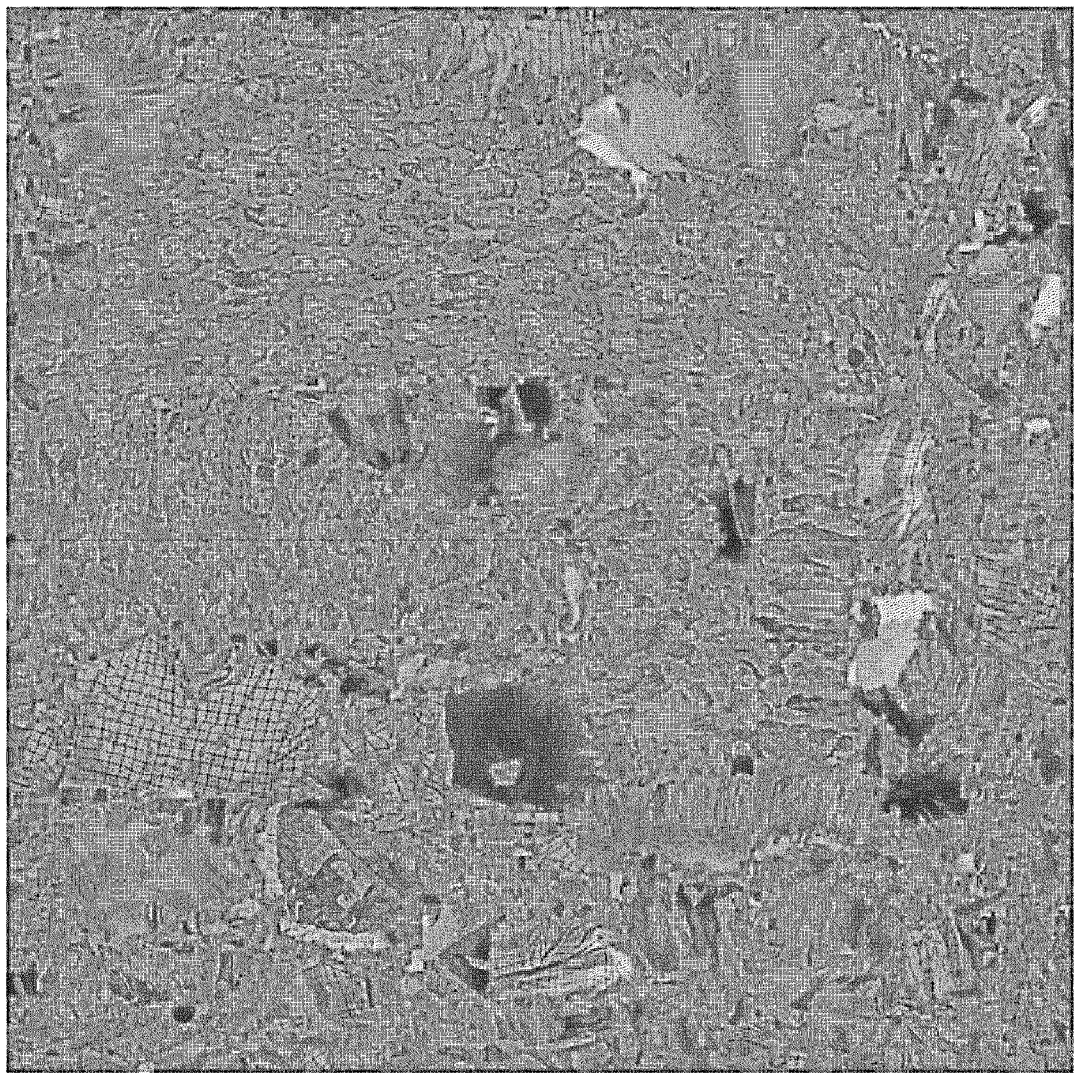
FIG. 5 illustrates a UV texture map to which an SPP algorithm is applied.

FIG. 5 illustrates a UV texture map to which an SPP algorithm is applied.

Referring to FIG. 4 and FIG. 5, it can be seen that the empty regions in FIG. 4 are filled by referring to neighboring colors in FIG. 5. By padding the empty regions as described above, the degree of discontinuity in the texture map may be decreased, and the compression efficiency may be improved.

Also, a process of generating a single texture map for mesh texturing from multi-view images requires many operations.

In order to generate a single texture map, it is necessary to extract texture values associated with a single point on the surface of a 3D model from multi-view images, to convert the same into a single texture value capable of representing the optimal rendering result, and to store the texture value in the texture map.

Figure 6:
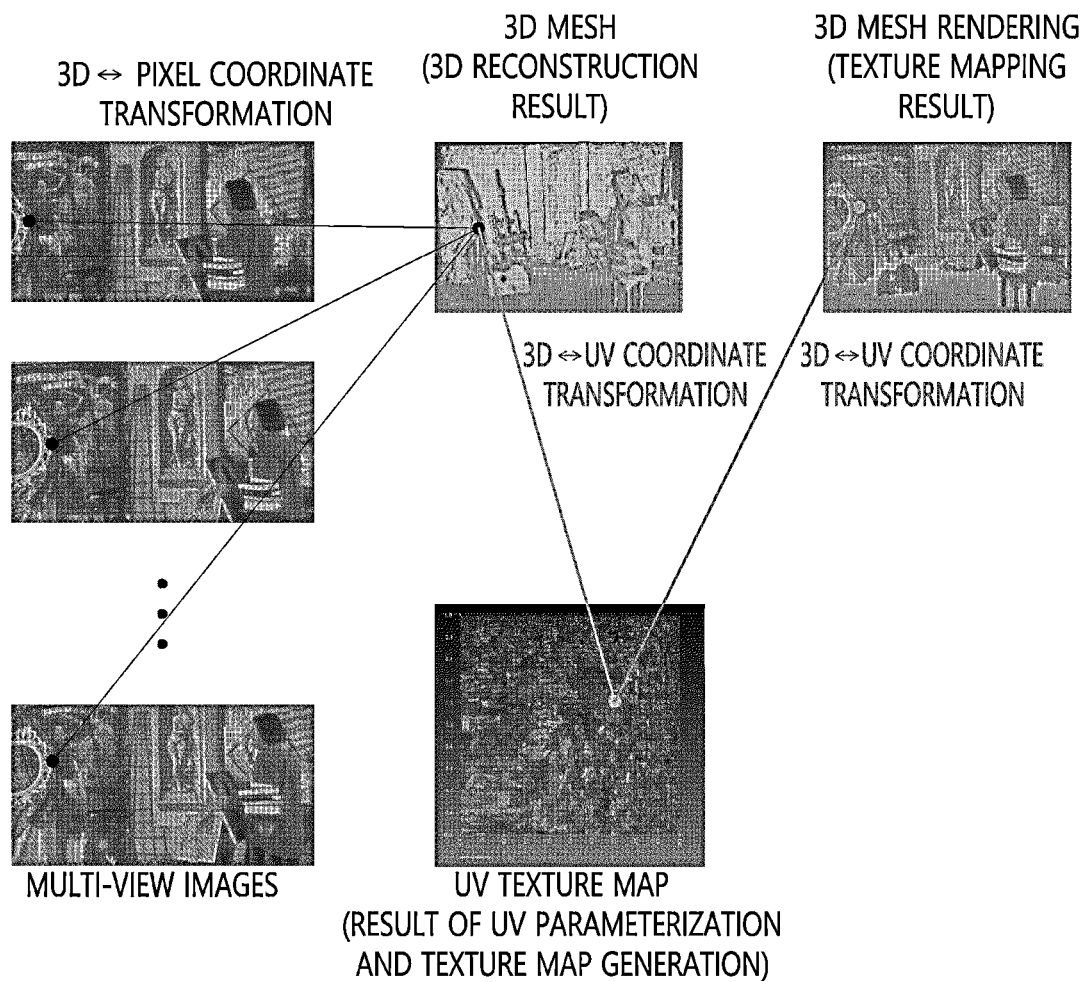
FIG. 6 is an example of coordinate transformation between multi-view images, a UV texture map, and a rendered image.

FIG. 6 is an example of coordinate transformation between multi-view images, a UV texture map, and a rendered image.

In the method according to an embodiment of the present disclosure, a texture map is optimized in terms of rate-distortion by using a differentiable image codec.

Here, a compression code rate is measured using a texture map, but compression distortion is measured by rendering the decoded texture map. The reason for this is that distortion of the rendered image may be large although distortion of the texture map is small.

Therefore, compression distortion is measured using a rendered image, which is the targeted output state of the texture map, and the texture map is optimized.

Also, the entire process is designed to enable iterative optimization using a differentiable renderer.

Figure 7:
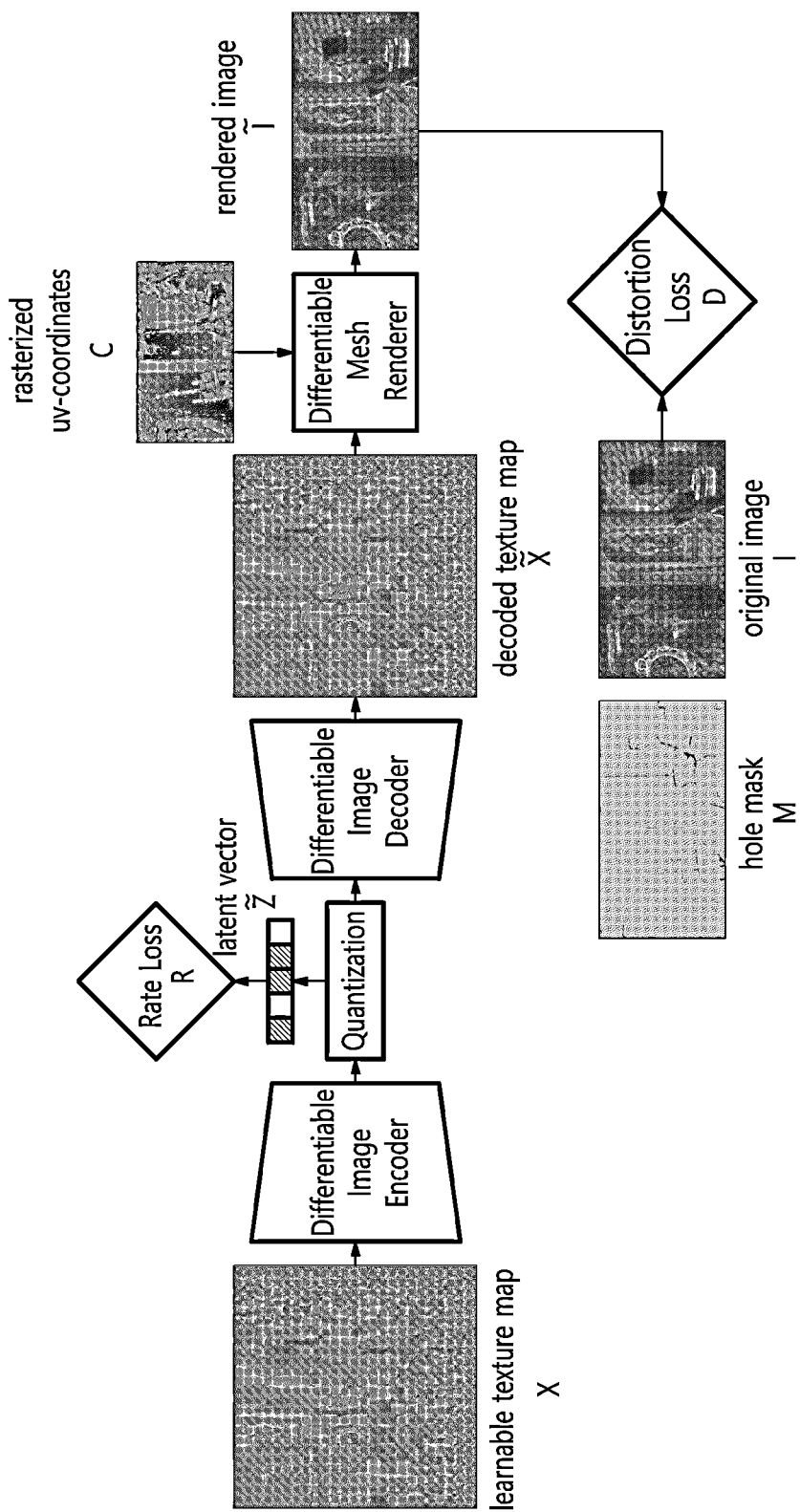
FIG. 7 is a view illustrating a process of generating a texture map according to an embodiment of the present disclosure.

FIG. 7 is a view illustrating a process of generating a texture map according to an embodiment of the present disclosure.

Here, the differentiable image encoder of FIG. 7 may correspond to an encoder based on an existing differentiable method.

Here, the compression expression vector of an input texture map in the encoder may be represented as shown in Equation (1) below:

$$\tilde{z} = \mathcal{E}(X) \tag{1}$$

Also, the compression expression vector output from the decoder may be represented as shown in Equation (2) below:

$$\tilde{X} = \mathcal{D}(\tilde{z}) \tag{2}$$

Here, the compression rate of the texture map may be represented as shown in Equation (3) below:

$$R(X) = -\frac{1}{N}\sum_{i=1}^{N}\log_{p(\tilde{Z})}(\mathcal{E}(X)_i) = -\frac{1}{N}\sum_{i=1}^{N}\log_{p(\tilde{Z})}(\tilde{z}_i) \tag{3}$$

The differentiable mesh renderer in FIG. 7 calculates texture coordinates (UV coordinates) corresponding to the image in a viewing direction for each pixel. Also, the differentiable mesh renderer performs rendering by sampling the coordinates stored in the pixels using an interpolation function, such as bilinear or nearest interpolation, in the texture map.

Here, the above-mentioned renderer may correspond to an interpolation-based differentiable renderer.

Here, the rendered image from the viewpoint v, which is acquired by sampling the decoded texture map to the texture coordinate map $C_v$, may be represented as shown in Equation (4) below:

$$\tilde{I}_v = \mathcal{S}(\tilde{X}, C_v) \tag{4}$$

Here, $I_v$ in Equation (4) denotes the original image from the viewpoint v.

Here, the compression distortion according to an embodiment may be calculated using Equation (5) below:

$$D(\tilde{X}) = \frac{1}{V}\sum_{v=1}^{V}\|I_v - \mathcal{S}(\tilde{X}, C_v)\|_2^2 = \frac{1}{V}\sum_{v=1}^{V}\|I_v - \tilde{I}_v\|_2^2 \tag{5}$$

Here, V denotes the number of viewpoints of multi-view images, and the compression distortion may be calculated by rendering all of the V views.

Here, when a 3D mesh is reconstructed from the multi-view real images, not all of the surfaces in the images may be reconstructed, and when the 3D mesh is rendered, an unrendered pixel region (a hole) may be generated.

Here, in order to prevent the unrendered pixel region (the hole) from resulting in optimization failure, a binary mask capable of representing the hole pixel region may be used when the compression distortion is measured.

Equation (6) below represents calculation of compression distortion using a binary mask.

$$D(\tilde{X}) = \frac{1}{V}\sum_{v=1}^{V}\|M_v \cdot (I_v - \tilde{I}_v)\|_2^2 \tag{6}$$

In Equation (6), $M_v$ may correspond to a binary mask having a size equal to the size of the image, in which a valid rendered region of v is represented as 1 and an empty region is represented as 0. Accordingly, using the binary mask such as Equation (6), the distortion of the actual pixels, excluding the hole, may be measured.

Finally, the texture map X is optimized using the loss function L(X) of Equation (7) below:

$$\operatorname*{argmin}_{X} \mathcal{L}(X) = \operatorname*{argmin}_{X}(R(X) + \lambda \cdot D(\mathcal{D}(\mathcal{E}(X)))) \tag{7}$$

Here, the ratio between an increase in the compression performance and a weight for a decrease in distortion may be adjusted using the constant λ when the texture map is optimized.

The method of generating a texture map according to an embodiment updates a texture map so as to gradually minimize a loss function, thereby optimizing the same.

In Equation (7) above, R(X) serves to increase the compression performance of the texture map, and D($\mathcal{D}$(ε(X))) serves to increase the rendering performance of the texture map.

Figure 8:
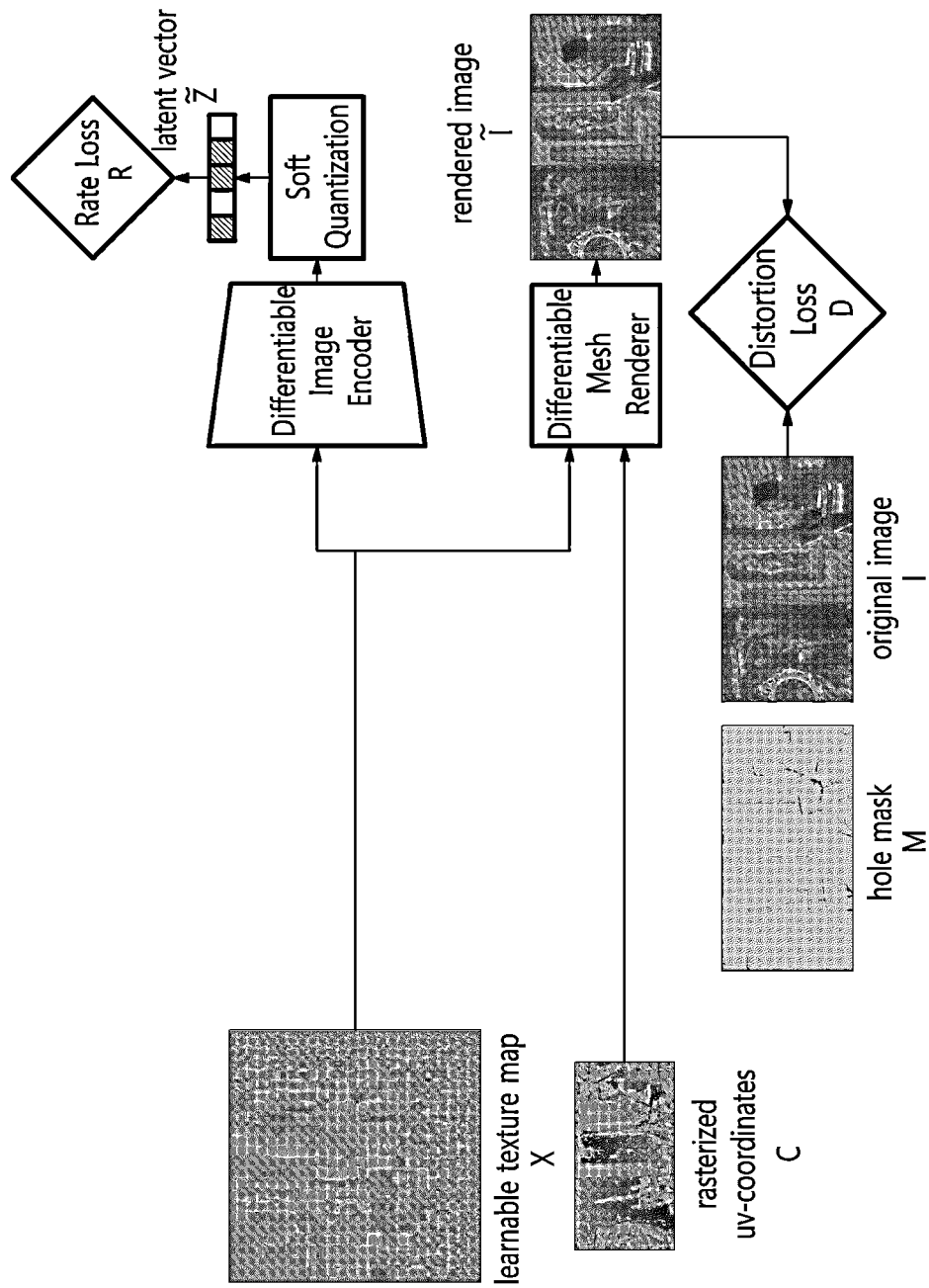
FIG. 8 is a view illustrating a process of generating a texture map according to another embodiment of the present disclosure.

FIG. 8 is a view illustrating a process of generating a texture map according to another embodiment of the present disclosure.

Referring to the structure of FIG. 8, it can be seen that the rendering distortion is measured using an unencoded texture map, unlike the structure of FIG. 7. Also, the compression bitrate of the texture map is calculated using only the encoder of the codec.

Here, the loss function in the structure of FIG. 8 is also set to be the same as Equation (7) above, whereby the texture map may be updated.

Figure 9:
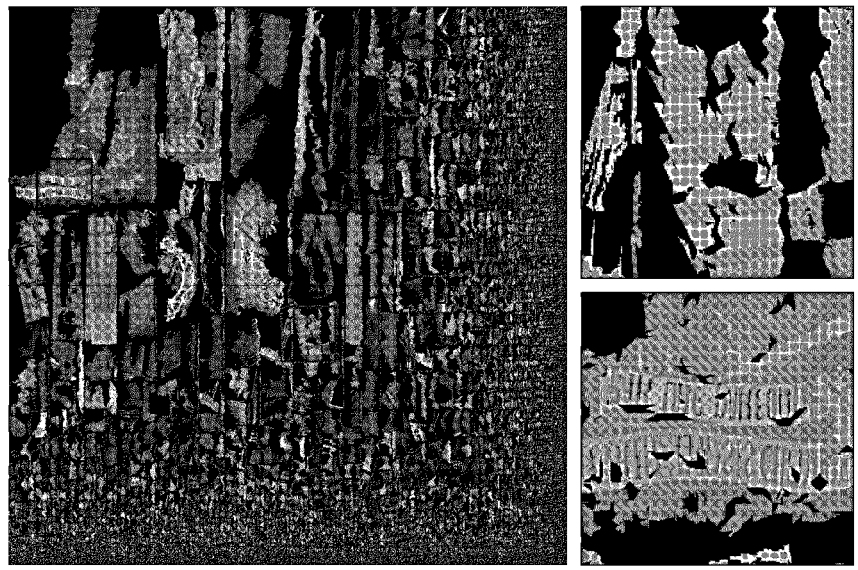
FIG. 9 illustrates a texture map before padding of a first image.

FIG. 9 illustrates a texture map of a first image before padding.

Figure 10:
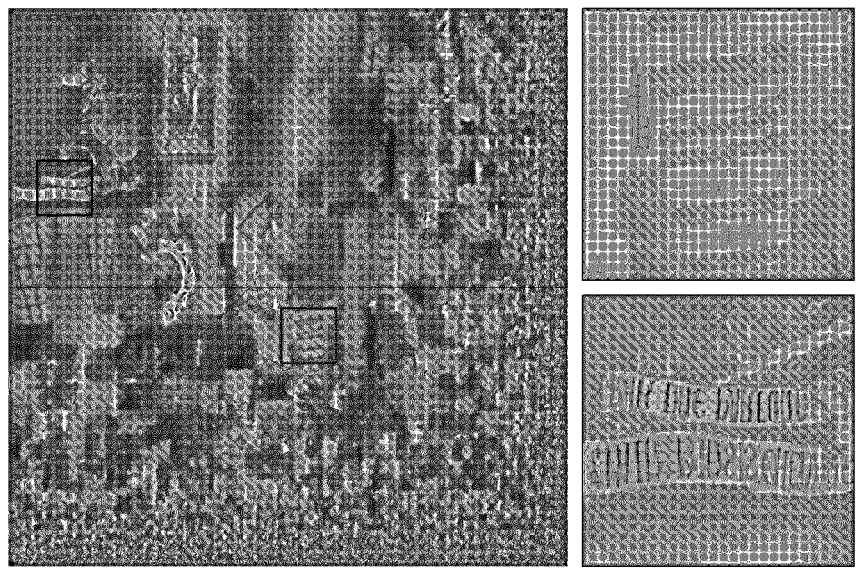
FIG. 10 illustrates that padding is performed on the texture map of a first image using an SPP algorithm.

FIG. 10 illustrates that padding is performed on the texture map of the first image using an SPP algorithm.

Figure 11:
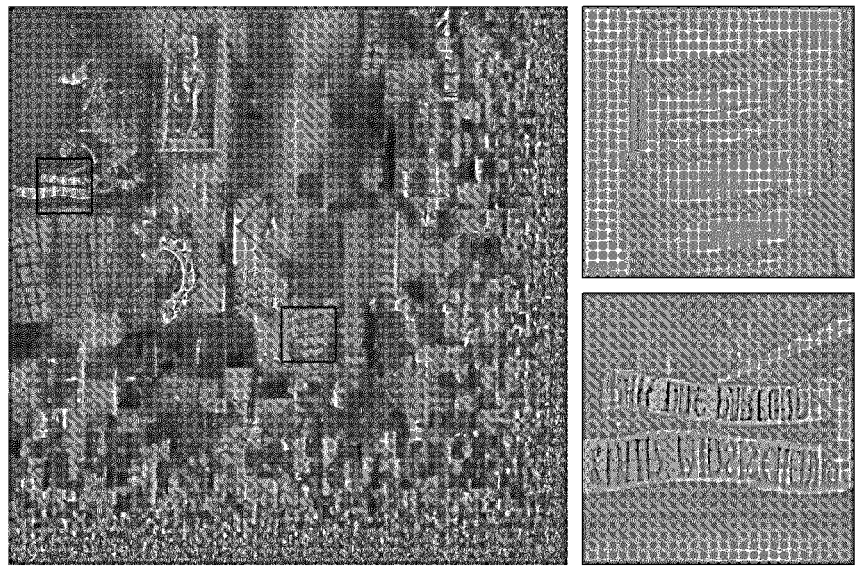
FIG. 11 illustrates that padding is performed on the texture map of a first image using a method according to an embodiment of the present disclosure.

FIG. 11 illustrates that padding is performed on the texture map of the first image using the method according to an embodiment of the present disclosure.

Referring to FIGS. 9 to 11, it can be seen that the method using the SPP algorithm decreases only the color discontinuity of the texture map, but the method according to an embodiment of the present disclosure decreases not only the color discontinuity of the texture map but also the shape discontinuity thereof.

Figure 12:
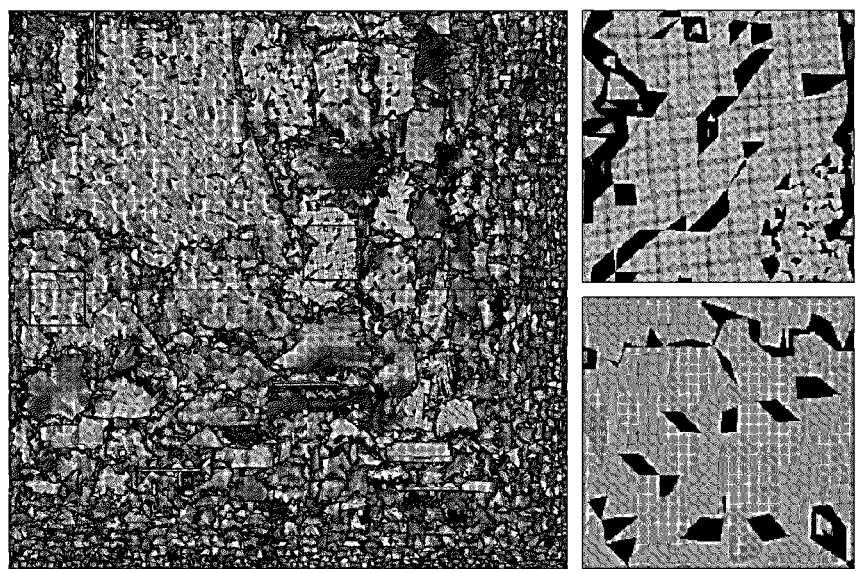
FIG. 12 illustrates a texture map before padding of a second image.

FIG. 12 illustrates a texture map of a second image before padding.

Figure 13:
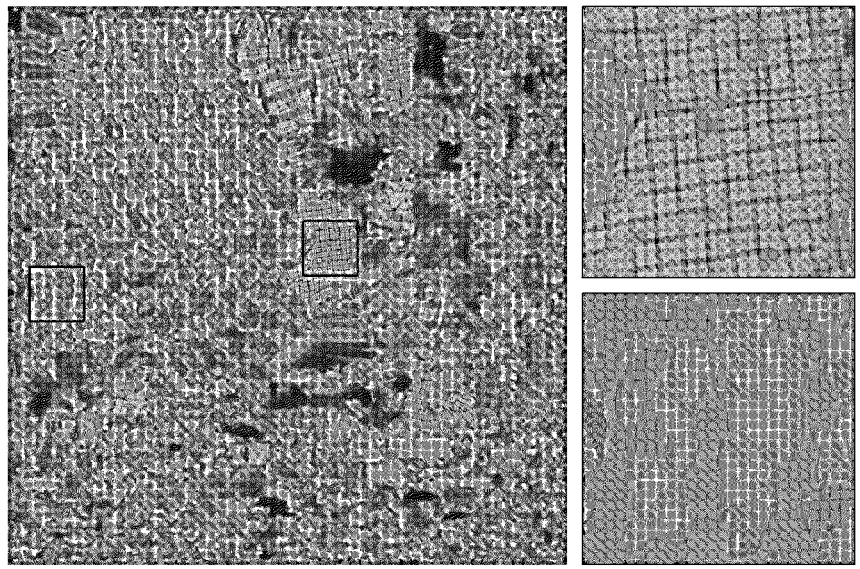
FIG. 13 illustrates that padding is performed on the texture map of a second image using an SPP algorithm.

FIG. 13 illustrates that padding is performed on the texture map of the second image using the SPP algorithm.

Figure 14:
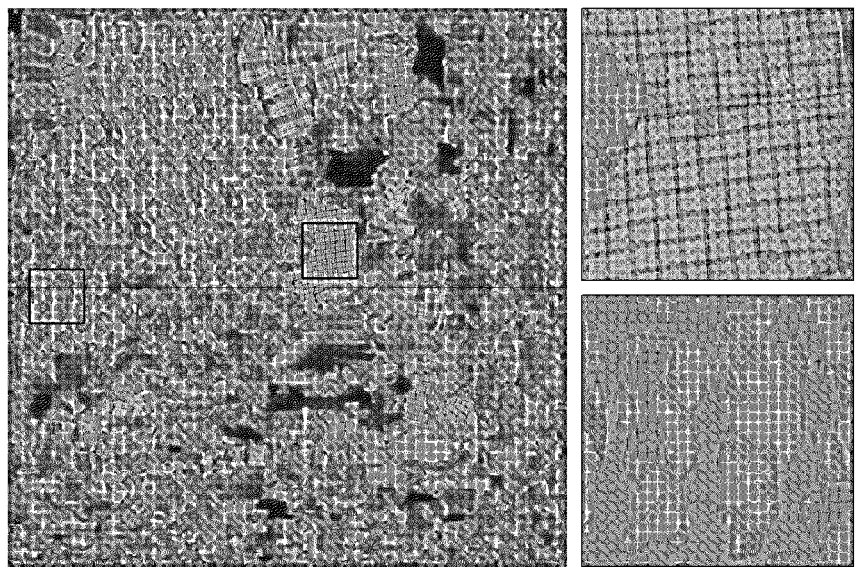
FIG. 14 illustrates that padding is performed on the texture map of a second image using a method according to an embodiment of the present disclosure.
Figure 15:
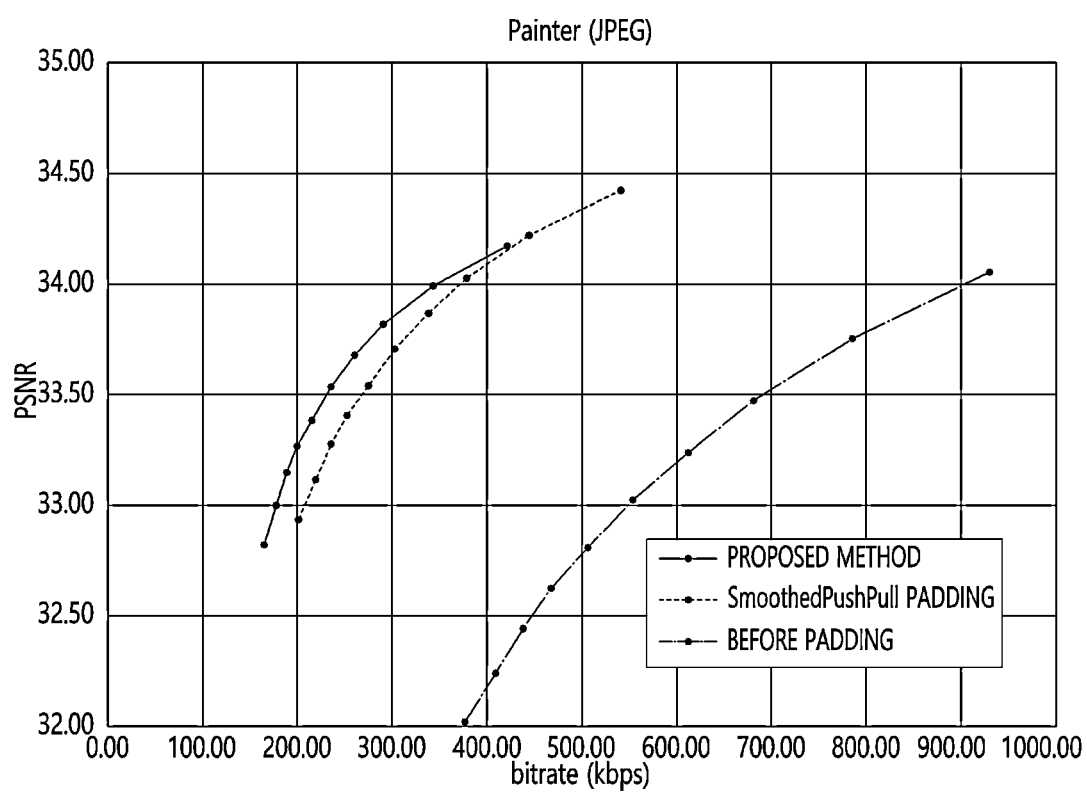
FIGS. 15 to 18 are graphs for comparing the performance of an existing method with the performance of a method according to an embodiment of the present disclosure.
Figure 16:
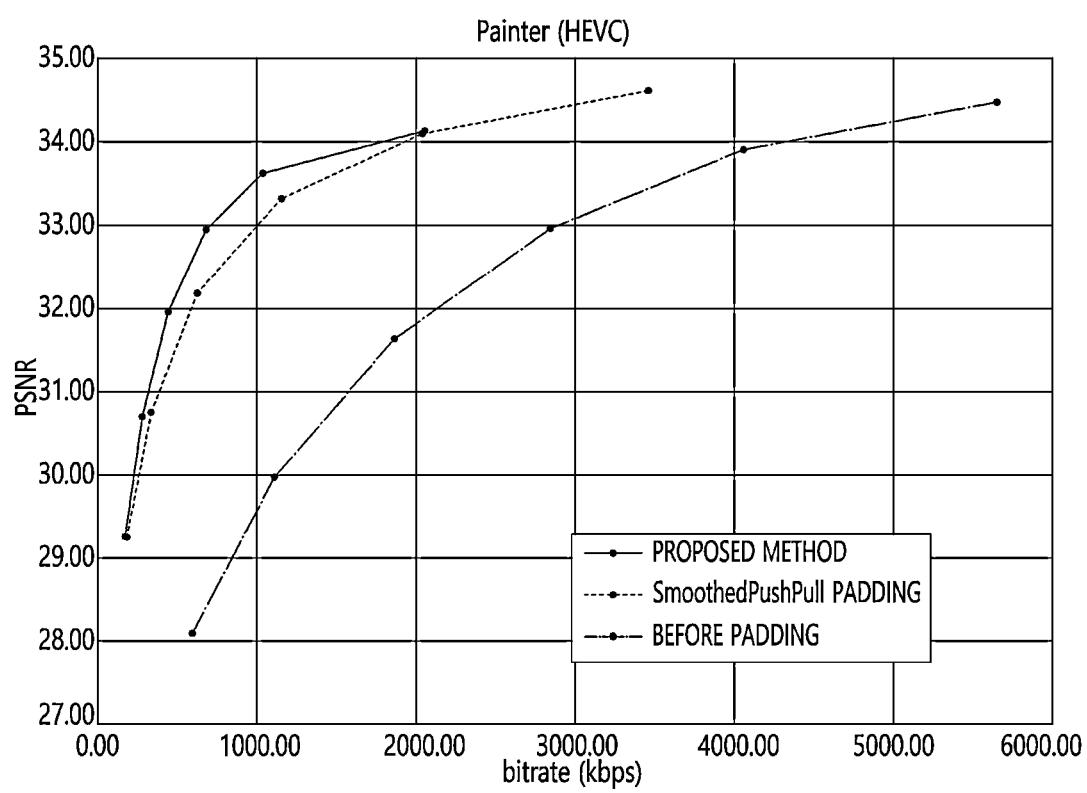
Figure 17:
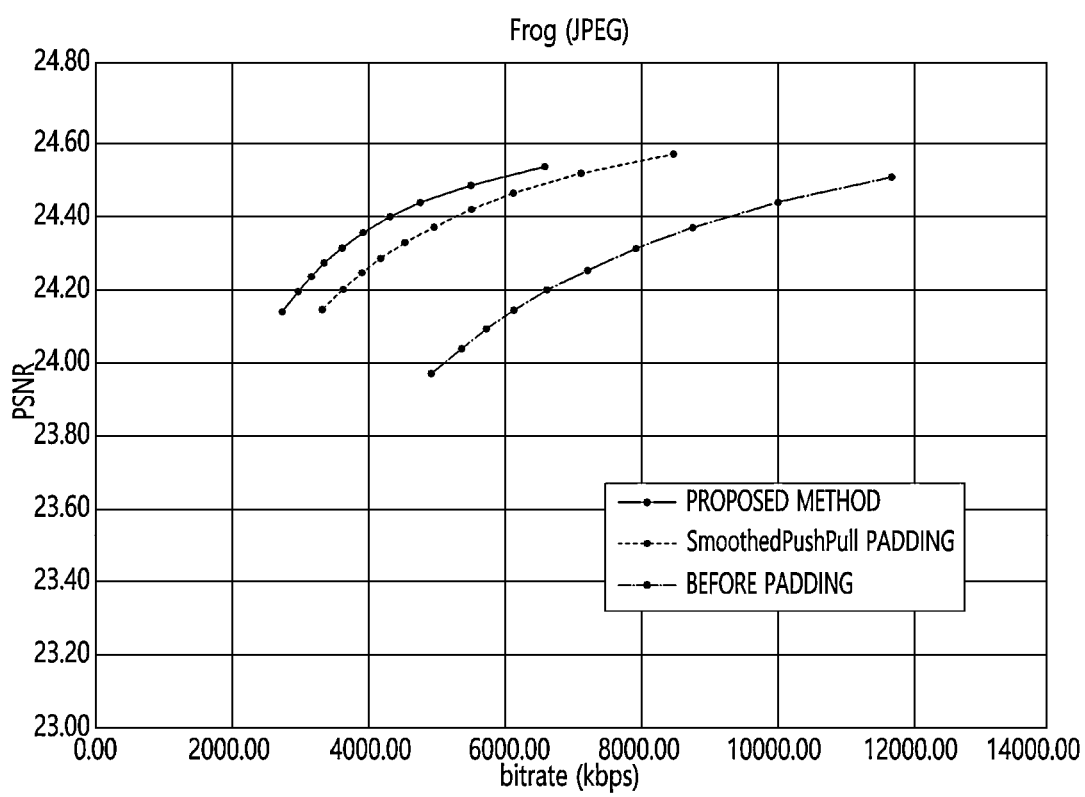
Figure 18:
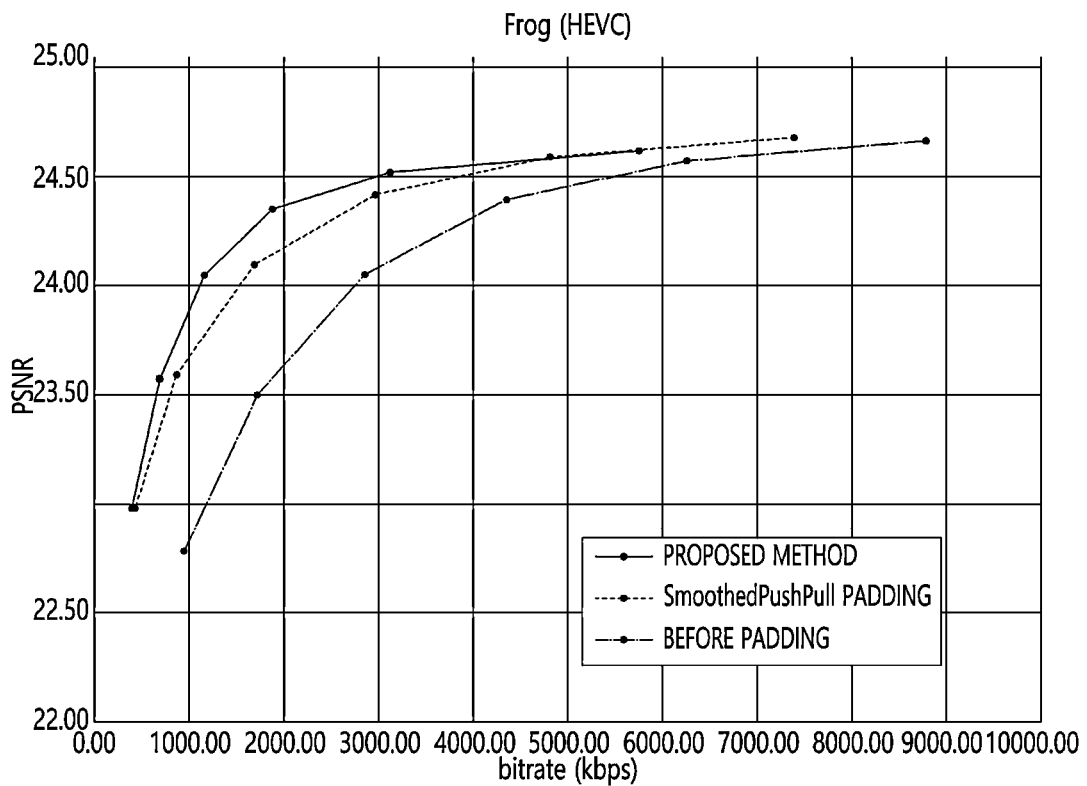

FIG. 14 illustrates that padding is performed on the texture map of the second image using the method according to an embodiment of the present disclosure.

Referring to FIGS. 12 to 14, it can be seen that the method using the SPP algorithm decreases only the color discontinuity of the texture map, but the method according to an embodiment of the present disclosure decreases not only the color discontinuity of the texture map but also the shape discontinuity thereof.

FIGS. 15 to 18 are graphs that compare the performance of the existing method with the performance of the method according to an embodiment of the present disclosure.

Referring to FIGS. 15 to 18, a texture map is compressed using JPEG or HEVC, and distortion (PSNR) is measured by rendering multi-view images using a decoded texture map. Here, it can be seen that the method according to an embodiment of the present disclosure more efficiently generates a texture map than the existing method (SPP) in terms of compression efficiency.

Figure 19:
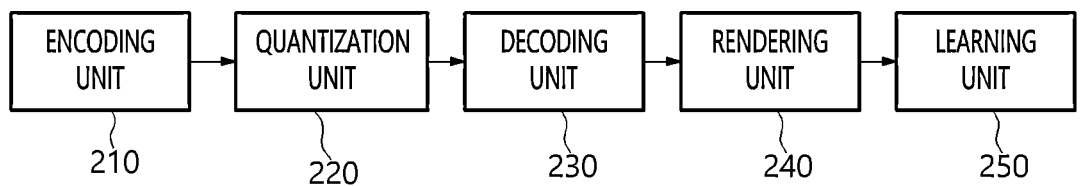
FIG. 19 is a block diagram illustrating an apparatus for generating a texture map of a 3D mesh according to an embodiment of the present disclosure.

FIG. 19 is a block diagram illustrating an apparatus for generating a texture map of a 3D mesh according to an embodiment of the present disclosure.

Referring to FIG. 19, an apparatus for generating a texture map of a 3D mesh according to an embodiment of the present disclosure includes an encoding unit 210 for encoding a texture map of a 3D mesh, a quantization unit 220 for quantizing the encoded texture map, a decoding unit 230 for decoding the quantized texture map, a rendering unit 240 for performing rendering using the decoded texture map, and a learning unit 250 for updating the texture map of the 3D mesh based on the value of a loss function.

Here, the loss function may include a first loss function corresponding to the compression performance of the texture map and a second loss function corresponding to the rendering performance of the texture map.

Here, the encoding unit 210 may perform encoding using a differentiable encoder, and the rendering unit 240 may perform rendering using a differentiable renderer.

Here, the first loss function may be calculated based on a quantized compression expression vector of the texture map of the 3D mesh.

Here, the second loss function may be calculated using a rendered image and an original image.

Here, the second loss function may be calculated using a binary mask for reflecting unrendered pixels.

Here, the rendering unit 240 may perform rendering using the unencoded texture map of the 3D mesh.

Figure 20:
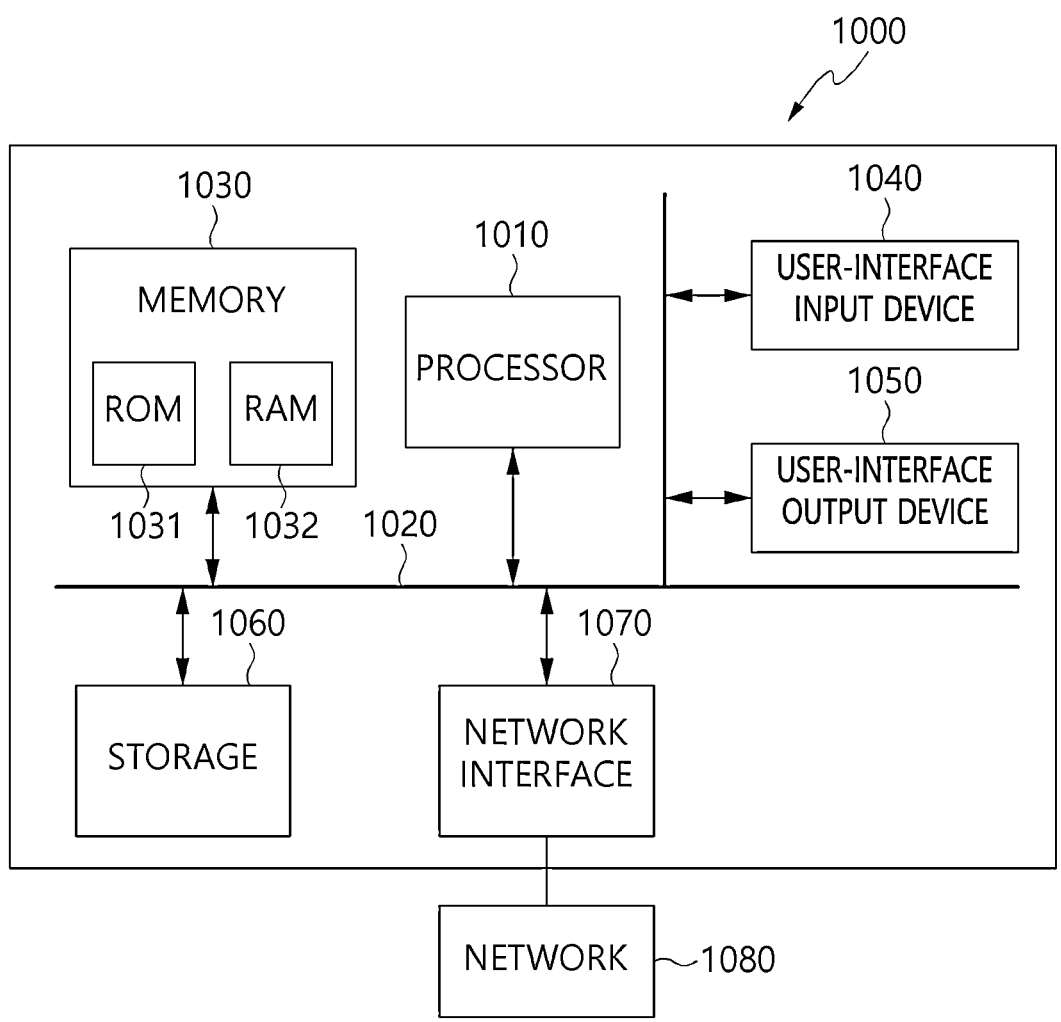
FIG. 20 is a view illustrating the configuration of a computer system according to an embodiment.

FIG. 20 is a view illustrating the configuration of a computer system according to an embodiment.

The apparatus for generating a texture map of a 3D mesh according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the present disclosure, the compression performance of a texture map of a 3D mesh reconstructed from multi-view images may be improved.

Also, the present disclosure may provide technology for updating a texture map by reflecting compression performance and rendering performance.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for generating a texture map of a three-dimensional (3D) mesh, comprising:
    encoding a texture map of a 3D mesh;
    quantizing the encoded texture map;
    decoding the quantized texture map;
    performing rendering using the decoded texture map; and
    updating the texture map of the 3D mesh based on a value of a loss function,
    wherein the loss function includes a first loss function corresponding to compression performance of the texture map and a second loss function corresponding to rendering performance of the texture map,
    wherein the second loss function is calculated using a rendered image, an original image, and a binary mask for reflecting an unrendered pixel.

2. The method of claim 1, wherein:
    encoding the texture map is performed using a differentiable encoder, and
    performing the rendering is performed using a differentiable renderer.

3. The method of claim 2, wherein the first loss function is calculated based on a quantized compression expression vector of the texture map of the 3D mesh.

4. The method of claim 3, wherein performing the rendering comprises performing the rendering using the unencoded texture map of the 3D mesh.

5. An apparatus for generating a texture map of a three-dimensional (3D) mesh, comprising:
- an encoding unit for encoding a texture map of a 3D mesh;
- a quantization unit for quantizing the encoded texture map;
- a decoding unit for decoding the quantized texture map;
- a rendering unit for performing rendering using the decoded texture map; and
- a learning unit for updating the texture map of the 3D mesh based on a value of a loss function,
- wherein the loss function includes a first loss function corresponding to compression performance of the texture map and a second loss function corresponding to rendering performance of the texture map, and
- wherein the second loss function is calculated using a rendered image, an original image, and a binary mask for reflecting an unrendered pixel.

6. The apparatus of claim 5, wherein:
- the encoding unit performs encoding using a differentiable encoder, and
- the rendering unit performs rendering using a differentiable renderer.

7. The apparatus of claim 6, wherein the first loss function is calculated based on a quantized compression expression vector of the texture map of the 3D mesh.

8. The apparatus of claim 7, wherein the rendering unit performs rendering using the unencoded texture map of the 3D mesh.

* * * * *